United States Patent
Shang et al.

(10) Patent No.: US 11,423,307 B2
(45) Date of Patent: Aug. 23, 2022

(54) TAXONOMY CONSTRUCTION VIA GRAPH-BASED CROSS-DOMAIN KNOWLEDGE TRANSFER

(71) Applicant: International Business Machines Corporation, Armonk, NY (US)

(72) Inventors: Chao Shang, Medford, MA (US); Sarthak Dash, Jersey City, NJ (US); Md Faisal Mahbub Chowdhury, Woodside, NY (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 16/891,207

(22) Filed: Jun. 3, 2020

(65) Prior Publication Data
US 2021/0383205 A1 Dec. 9, 2021

(51) Int. Cl.
| | |
|---|---|
| *G06N 3/08* | (2006.01) |
| *G06N 20/00* | (2019.01) |
| *G06F 40/237* | (2020.01) |
| *G06F 40/20* | (2020.01) |
| *G06F 40/279* | (2020.01) |
| *G06F 40/284* | (2020.01) |
| *G06K 9/62* | (2022.01) |

(52) U.S. Cl.
CPC .............. *G06N 3/08* (2013.01); *G06F 40/20* (2020.01); *G06F 40/237* (2020.01); *G06F 40/279* (2020.01); *G06F 40/284* (2020.01); *G06N 20/00* (2019.01); *G06K 9/6201* (2013.01); *G06K 9/6224* (2013.01); *G06K 9/6232* (2013.01); *G06K 9/6296* (2013.01)

(58) Field of Classification Search
None
See application file for complete search history.

(56) References Cited

U.S. PATENT DOCUMENTS

| | | | |
|---|---|---|---|
| 8,566,321 | B2 | 10/2013 | Majumdar |
| 8,903,825 | B2 | 12/2014 | Parker et al. |
| 10,372,724 | B2 | 8/2019 | Majumdar |
| 2017/0329760 | A1 | 11/2017 | Rachevsky |

(Continued)

OTHER PUBLICATIONS

Shen, Jiaming, Zhihong Shen, Chenyan Xiong, Chi Wang, Kuansan Wang, and Jiawei Han. "TaxoExpan: Self-supervised taxonomy expansion with position-enhanced graph neural network." In Proceedings of The Web Conference 2020, pp. 486-497. 2020. (Year: 2020).*

(Continued)

*Primary Examiner* — Frank D Mills
(74) *Attorney, Agent, or Firm* — Lieberman & Brandsdorfer, LLC

(57) ABSTRACT

A system, computer program product, and method are provided for employing a graph neural network (GNN) to construct a taxonomy. The GNN is subject to a training cycle and an inference cycle. The training cycle encodes cross-domain terms pairs from a set of noisy cross domain pairs extracted from a corpora, and outputs a preliminary taxonomy. The inference cycle identifies candidate term pairs and selectively subjects the candidate term pairs to selective filtering to produce a system predicted taxonomy from the preliminary taxonomy.

18 Claims, 9 Drawing Sheets

(56) References Cited

U.S. PATENT DOCUMENTS

| | | | |
|---|---|---|---|
| 2021/0081500 A1* | 3/2021 | Dash | G06F 40/30 |
| 2021/0334606 A1* | 10/2021 | Du | G06N 20/10 |

OTHER PUBLICATIONS

Yu, Yue, Jie Chen, Tian Gao, and Mo Yu. "DAG-GNN: DAG structure learning with graph neural networks." In International Conference on Machine Learning, pp. 7154-7163. PMLR, 2019. (Year: 2019).*

Swoboda, Tobias, Matthias Hemmje, Mihai Dascalu, and Stefan Trausan-Matu. "Combining taxonomies using word2vec." In Proceedings of the 2016 ACM Symposium on Document Engineering, pp. 131-134. 2016. (Year: 2016).*

Kozareva, Zornitsa, and Eduard Hovy. "A semi-supervised method to learn and construct taxonomies using the web." In Proceedings of the 2010 conference on empirical methods in natural language processing, pp. 1110-1118. 2010. (Year: 2010).*

Wang, C., et al., "Predicting hypernym-hyponym relations for Chinese taxonomy learning", Knowledge Information Systems, Feb. 2018.

Wang, C., et al., "Improving Hypernym Prediction via Taxonomy Enhanced Adversarial Learning", The Thirty-Third AAAI Conference on Artificial Intelligence (AAAI-19), pp. 7128-7135, Jul. 17, 2019.

Anonymous, "A reinforcement learning recommendation system for best match based on dynamically updated business taxonomy", IPCOM000259792D, Sep. 18, 2019.

Anonymous, "A System and Method for the Taxonomy-guided Event and Evolving Topic Detection in News Streams", IPCOM000259751D, Sep. 13, 2019.

IBM, "Automatic Taxonomy Generator System", IPCOM000021985D, Feb. 18, 2004.

Gupta, A., et al., "Taxonomy Induction Using Hypernym Subsequences", arXiv:1704.07626v4, Sep. 14, 2017.

Zhang, C., et al., "TaxoGen: Unsupervised Topic Taxonomy Construction by Adaptive Term Embedding and Clustering", Association for Computing Machinery, Conference '17, Jul. 2017.

Alfarone, D., et al., "Unsupervised Learning of an IS-A Taxonomy from a Limited Domain-Specific Corpus", Proceedings of the Twenty-Fourth International Joint Conference on Artificial Intelligence (IJCAI 2015), pp. 1434-1441.

Tuan, Luu Anh, et al., "Taxonomy Construction Using Syntactic Contextual Evidence", Proceedings of the 2014 Conference on Empirical Methods in Natural Language Processing (EMNLP), pp. 810-819, Oct. 2014.

Bansal, M., et al., "Structured Learning for Taxonomy Induction with Belief Propagation", Proceedings of the 52nd Annual Meeting of the Association for Computational Linguistics, pp. 1041-1051, Jun. 2014.

Baroni, M., et al., "Entailment above the word level in distributional semantics", Proceedings of the 13th Conference of the European Chapter of the Association for Computational Linguistics, pp. 23-32, Apr. 2012.

Van Den Berg, R., et al., "Graph Convolutional Matrix Completion", arXiv: 1706.02263v2, Oct. 25, 2017.

Bordea, G., et al., SemEval—2016 Task 13: Taxonomy Extraction Evaluation (TExEval-2), Proceedings of SemEval—2016, pp. 1081-1091, Jun. 2016.

Bruna, J., et al., "Spectral Networkds and Deep Locally Connected Networks on Graphs", arXiv:1312.6203v3, May 21, 2014.

Chen, Z., et al., "Supervised Community Detection with Line Graph Neural Networks", arXiv:1705.08415v5, Oct. 26, 2018.

Chickering, David Maxwell, "Learning Bayesian Networks is NP-Complete", pp. 121-130, 1996.

Chickering, David M., et al., "Large-Sample Learning of Bayesian Networks is NP-Hard", Journal of Machine Learning Research 5 (2004), pp. 1287-1330.

Dettmers, T., et al., "Convolutional 2D Knowledge Graph Embeddings", The Thirty-Second AAAI Conference on Artificial Intelligence (AAAI-18), pp. 1811-1818, 2018.

Friedrich, G., et al., "A Taxonomy for Generating Explanation in Recommender Systems", AI Magazine, pp. 90-98, 2011.

Gao, H., et al., "Large-Scale Learnable Graph Convolutional Networks", KDD 2018, pp. 1416-1424, Aug. 2018.

Gilmer, J., et al., "Neural Message Passing for Quantum Chemistry", Proceedings of the 34th International Conference on Machine Learning, 2017, arXiv:1704.01212v2, Jun. 12, 2017.

Gori, Maria C., et al., "A New Model for Learning in Graph Domains", DOI: 10.1109/IJCNN.2005.1555942 • Source: IEEE Xplore, Conference paper 2015.

Gupta, A., et al., "Taxonomy Induction Using Hypernym Subsequences", Proceedings of the 2017 ACM Conference on Information and Knowledge Management, Session 7E: Text Mining, Nov. 2017.

Hamilton, W., "Inductive Representation Learning on Large Graphs", 31st Conference on Neural Information Processing Systems (NIPS 2017).

Harabagiu, S., "Open-Domain Textual Question Answering Techniques", Natural Language Engineering, 9(3): 1-38, 2003.

Hearst, M., "Automatic Acquisition of Hyponyms from Large Text Corpora", Proceedings of COLING-92, pp. 539-545, 1992.

Dhage, P., et al., "Understand Short Texts By Harvesting & Analyzing Semantic Knowledge", Journal of Analysis and Computation (JAC), vol. XIII, Issue I, Jan. 2019.

Huang, H., et al., "Maximum F1-Score Discriminative Training for Automatic Mispronunciation Detection in Computer-Assisted Language Learning", Interspeech 2012, ISAC's 13th Annual Conference, Sep. 2012.

Kipf, T., et al., "Semi-Supervised Classification With Graph Convolutional Networks", ICLR 2017, arXiv:1609.029074, Feb. 22, 2017.

Kozareva, Z., et al., "A Semi-Supervised Method to Learn and Construct Taxonomies Using the Web", Proceedings of the 2010 Conference on Empirical Methods in Natural Language Processing, pp. 1110-1118, 2010.

Mao, Y., et al., "End-to-End Reinforcement Learning for Automatic Taxonomy Induction", arXiv: 1805.04044v1, May 10, 2018.

Panchenko, A., et al., "TAXI at SemEval—2016 Task 13: a Taxonomy Induction Method based on Lexico-Syntactic Patterns, Substrings and Focused Crawling", Proceedings of SemEval—2016, pp. 1320-1327, 2016.

Ritter, A., et al., "What Is This, Anyway: Automatic Hypernym Discovery", Association for the Advancement of Artificial Intelligence (AAAI), pp. 88-93, 2009.

Roller, S., et al., "Inclusive yet Selective: Supervised Distributional Hypernymy Detection", Proceedings of COLING 2014, the 25th International Conference on Computational Linguistics: Technical Papers, pp. 1025-1036, Aug. 2014.

Shang, C., et al., "End-to-end Structure-Aware Convolutional Networks for Knowledge Base Completion", Association tor the Advancement of Artificial Intelligence, arXiv:1811.04441v2, Nov. 15, 2018.

Shen, W., et al., "A Graph-Based Approach for Ontology Population with Named Entities", Proceedings of the 21st ACM International Conference on Information and Knowledge Management, CIKM '12, pp. 345-354, Oct. 2012.

Snow, R., et al., "Learning Syntactic Patterns for Automatic Hypernym Discovery", Advanced in Neural Information Processing Systems 17 (NIPS 2004).

Snow, R., et al., "Semantic Taxonomy Induction from Heterogenous Evidence", Proceedings of the 21st International Conference on Computational Linguistics and 44th Annual Meeting of the ACL, pp. 801-808, Jul. 2006.

Sperduti, A., et al., "Supervised Neural Networks for the Classification of Structures", IEEE Transactions on Neural Networks, 1997.

Suchanek, F., et al., "Yago: A large ontology from Wikipedia and wordnet", Dec. 2007.

(56) References Cited

OTHER PUBLICATIONS

Tarjan, "Depth-First Search and Linear Graph Algorithms", SIAM Journal on Computing, 1972, vol. 1, No. 2 : pp. 146-160.

Valerdi, P., et al., "OntoLearn Reloaded: A Graph-Based Algorithm for Taxonomy Induction", Computational Linguistics, vol. 39, No. 3, 2013.

Wang, C., et al., "A Short Survey on Taxonomy Learning from Text Corpora: Issues, Resources and Recent Advances", Proceedings of the 2017 Conference on Empirical Methods in Natural Language Processing, pp. 1190-1203, Sep. 2017.

Wu, W., et al., "Probase: A Probabilistic Taxonomy for Text Understanding", SIGMOD '12, Proceedings of the 2012 ACM SIGMOD International Conference on Management of Data, pp. 481-492, May 2012.

Xu, K., et al., "How Powerful are Graph Neural Networks?", ICLR 2019, arXiv: 1810.00826v3, Feb. 22, 2019.

Ying, R., et al., "Hierarchical Graph Representation Learning with Differentiable Pooling", arXiv:1806.08804v4, Feb. 20, 2019.

Yu, Y., et al., "DAG-GNN: DAG Structure Learning with Graph Neural Networks", Proceedings of the 36th International Conference on Machine Learning, arXiv: 1904.10098v1, Apr. 22, 2019.

Zheng, X., et al., "DAGs with No Tears: Continuous Optimization for Structure Learning", arXiv:1803.01422v2, Nov. 3, 2018.

Maitra, P., et al., "JUNLP at SemEval—2016 Task 13: A Language Independent Approach for Hypernym Identification", Proceedings of SemEval—2016, pp. 1310-1314, Jun. 2016.

Monti, F., "Geometric deep learning on graphs and manifolds using mixture model CNNs", arXiv: 1611.08402v3, Dec. 6, 2016.

Martinez, J., et al., "USAAR at SemEval—2016 Task 11: Complex Word Identification with Sense Entropy and Sentence Perplexity", Proceedings of SemEval—2016, pp. 958-962, Jun. 2016.

Miller, G., et al., "Introduction to WordNet: An On-Line Lexical Database", International Journal of Lexicography, vol. 3, No. 4, 1990.

Tuan, L., et al., "Taxonomy Construction Using Syntactic Contextual Evidence", Proceedings of the 2014 Conference on Empirical Methods in Natural Language Processing (EMNLP), pp. 810-819, Oct. 2014.

\* cited by examiner

US 11,423,307 B2

TAXONOMY CONSTRUCTION VIA GRAPH-BASED CROSS-DOMAIN KNOWLEDGE TRANSFER

BACKGROUND

The present embodiment(s) relate to construction of a taxonomy hierarchy that encapsulates a set of terms. More specifically, latent features of taxonomy construction are learned from one or more existing domains to guide structured learning of an unseen domain and a taxonomy is generated for a new unknown domain given a set of terms for that domain.

SUMMARY

The embodiments include a system, computer program product, and method for leveraging machine learning for taxonomy generation, also referred to herein as taxonomy construction, of an unseen domain through graph-based cross-domain knowledge transfer.

In one aspect, a computer system is provided with a processing unit operatively coupled to a memory, and an artificial intelligence (AI) platform operatively coupled to the processing unit and memory. The AI platform is configured with tools in the form of a natural language processing (NLP) manager, a graph manager, a machine learning (ML) manager, and a taxonomy manager configured with functionality to support and enable system generation of a taxonomy representing an unseen domain. The NLP manager is configured to extract hyponym-hypernym term pairs from a corpus, with the extracted term pairs including at least one cross-domain term pair. The graph manager is configured to construct a cross-domain directed acyclic graph (DAG) based on the extracted term pairs. The DAG includes vertices and intra-domain and inter-domain edges. The ML manager is configured to train a ML model to build a taxonomy structure for a target domain. The ML model training uses a graph neural network (GNN) to aggregate neighbors of one or more of the represented nodes into clusters. In addition, the ML model training applies semantic clustering aggregation to the clusters and produces a preliminary taxonomy for the target domain. The preliminary taxonomy is subject to enrichment, such as selective filtering, to generate a system predicted taxonomy.

In another aspect, a computer program product is provided to support and enable taxonomy construction that represents an unseen domain. The computer program product is provided with a computer readable storage device having embodied program code to extract hyponym-hypernym term pairs from a corpus, with the extracted term pairs including at least one cross-domain term pair. Program code constructs a cross-domain directed acyclic graph (DAG) based on the extracted term pairs. The graph includes vertices and intra-domain and inter-domain edges. Program code trains a ML model to build a taxonomy structure for a target domain. The ML model training uses a graph neural network (GNN) to aggregate neighbors of one or more of the represented nodes into clusters, applies semantic clustering aggregation to the clusters, and produces a preliminary taxonomy for the target domain. Program code subjects the preliminary taxonomy to enrichment, such as selective filtering, to generate a system predicted taxonomy.

In yet another aspect, a computer-implemented method is provided for system generation of a taxonomy structure representing an unseen domain. Hyponym-hypernym term pairs are extracted from a corpus, with the extracted term pairs including at least one cross-domain term pair. A cross-domain directed acyclic graph (DAG) is constructed based on the extracted term pairs. The graph includes vertices and intra-domain and inter-domain edges. A ML model is subject to training to build a taxonomy structure for a target domain. The ML model training uses a graph neural network (GNN) to aggregate neighbors of one or more of the represented nodes into clusters. In addition, the ML model training applies semantic clustering aggregation to the clusters and produces a preliminary taxonomy for the target domain. The preliminary taxonomy is subject to enrichment, such as selective filtering, and a system predicted taxonomy is generated as output.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification and are incorporated herein. Features shown in the drawings are meant as illustrative of only some embodiments, and not of all embodiments, unless otherwise explicitly indicated.

DETAILED DESCRIPTION

Figure 1:
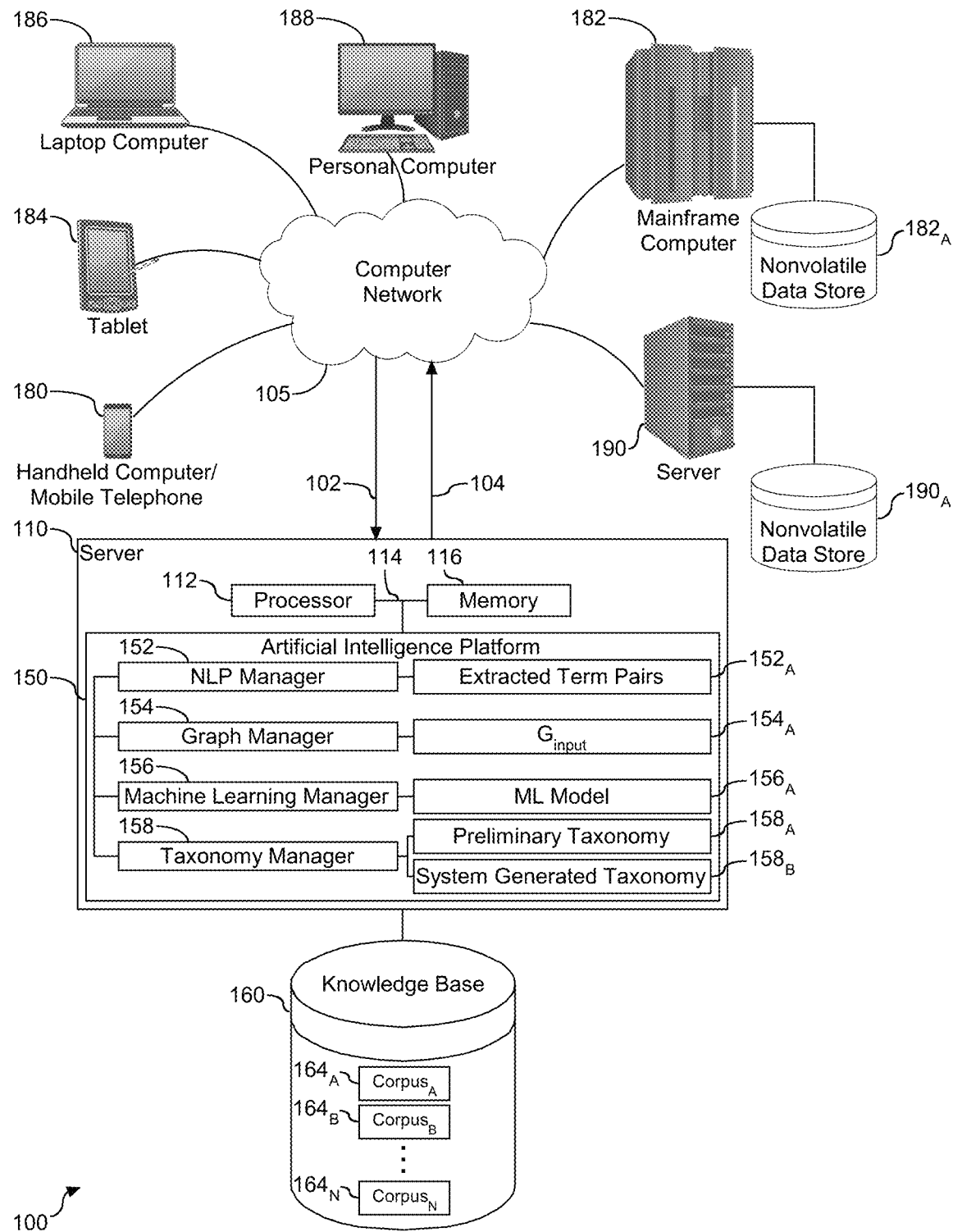
FIG. 1 depicts a system diagram illustrating a schematic diagram of a computer system and embedded tools to support taxonomy derivation and construction.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment. The various embodiments may be combined with one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. More specifically, ML is the application of AI through creation of models, for example, neural networks that can demonstrate learning behavior by performing tasks that are not explicitly programmed. Deep learning is a type of ML in which systems can accomplish complex tasks by using multiple layers of neurons that activate based on an output or outputs of a previous layer of neurons, creating increasingly smarter and more abstract activations.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neurons in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to some neurons in the next layer. At a basic level, each layer of the neural network includes one or more operators or functions operatively coupled to output and input. The outputs of evaluating the activation functions of each neuron with provided inputs are referred to herein as activations. Deep learning complex neural networks are designed to emulate how the human brain works, so computers can be trained to support poorly defined abstractions and problems where training data is available. Neural networks and deep learning are often used in image recognition, speech, and computer vision applications.

Taxonomy is the science of categorization or classification or things based on a predetermined system. For example, with respect to a web site or portal, the taxonomy pertains to the organization of its data into categories and sub-categories. Data classification is a process of sorting and categorizing data into various types, forms, or any other distinct class. More specifically, data classification enables separation and classification of data according to data set requirements for various objectives. Data classification involves various methods and criteria for sorting data.

A graph is a data structure representing components in the form of vertices, also referred to as nodes, and edges connecting nodes. The vertices represent data items, and the edges represent a relationship between two vertices. A directed acyclic graph (DAG) is a type of graph that is directed. The DAG is a graph that is not cyclic, meaning it is directed without cycles and each edge is directed from an earlier edge to a later edge. In graph theory, a graph is a series of vertexes connected by edges, and in a directed graph, the edges are connected so that each edge is unidirectional.

It is known in the art to express taxonomies as DAGs, and as such, taxonomy construction can be formulated as a DAG generation problem. Automatic taxonomy construction (ATC) generates taxonomical classifications from a corpus, e.g. body of text. ATC is a branch of natural language processing (NLP), which is a branch of artificial intelligence (AI). ATC is commonly used in NLP tasks, such as question answering, query understanding, recommendation systems, etc. More specifically, ATC involves the ability to recognize the following: a set of types, i.e. hypernyms, from a text corpus, instances, i.e. hyponyms, of each type, and hypernym relations, also known as is-a relations between a term and its hypernym. It is understood in the art that taxonomies specific to many domains are either absent or missing. As shown and described herein, a computer system, computer program product, and method are provided to construct a taxonomy for an unseen domain, e.g. a domain for which a taxonomy is not available.

As shown and described herein, a list of domain-specific terms from a target unseen domain are utilized as input, and are organized into a taxonomy, e.g. a taxonomy is constructed for the target unseen domain. Specifically, given an input corpus and a set of taxonomies, $G_{set}$, from some known domains different from the target domain, a neural model is trained to construct one or more taxonomies for the target unseen domain(s).

A graph neural network (GNN) is a type of neural network which directly operates on the graph structure. More specifically, the GNN functions on input defined in the language of nodes, edges, and neighborhoods, and utilizes message passing between nodes. Message passing includes collecting information from neighbors, aggregating the collected information, and update self-state and weights based on the aggregated representation. A typical application of the GNN is a node classification. Essentially, every node, v, in the graph is characterized by its feature, x, and associated with a label, t. There are two primary processes for the taxonomy construction, including a training cycle and an inference cycle.

Provided herein, is a system, computer program product, and method to derive and construct a taxonomy from a list of terms. Referring to FIG. 1, a computer system (100) is provided with tools to support taxonomy derivation and construction. As shown, a server (110) is provided in communication with a plurality of computing devices (180), (182), (184), (186), (188), and (190) across a network connection (105). The server (110) is configured with a processing unit (112) operatively coupled to memory (114) across a bus (116). A tool in the form of an artificial intelligence (AI) platform (150) is shown local to the server (110), and operatively coupled to the processing unit (112) and memory (114). As shown, the AI platform (150) contains one or more tools in the form of a natural language processing (NLP) manager (152), a graph manager (154), a machine learning (ML) manager (156), and a taxonomy manager (158). Together, the tools support and enable derivation and construction of the taxonomy over the network (105) from one or more computing devices (180), (182), (184), (186), (188), and (190). The computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable risk evaluation and modification management across distributed resources. Other embodiments of the server (110) may be used with components, systems, sub-systems, and/or devices other than those that are depicted herein.

The tools, including the AI platform (150), or in an embodiment, the tools embedded therein including the NLP manager (152), the graph manager (154), the ML manager (156), and the taxonomy manager (158) may be configured to receive input from various sources, including but not limited to input from the network (105), and an operatively coupled knowledge base (160). In an embodiment, the knowledge base (160) includes one or more collections of linguistic data. For illustrative purposes, the knowledge base (160) is shown with $corpus_A$ ($164_A$), $corpus_B$ ($164_B$), and $corpus_N$ ($164_N$). The quantity of corpora in the knowledge base (164) is for illustrative purposes and should not be considered limiting. The NLP manager (152), shown herein operatively coupled to the knowledge base (160) functions to extract a set of hyponym-hypernym term pairs from at least one of the corpora, e.g. ($164_A$), ($164_B$), and/or $corpus_N$ ($164_N$). In an embodiment, a corpus may span across two or more domains. The set of extracted term pairs ($152_A$), shown herein operatively coupled to the NLP manager (152), are referred to as a candidate set of hyponym-hypernym term pairs. In an embodiment, the term pairs ($152_A$) are extracted from a collection of input corpora that spans multiple subject matter domains. The candidate hyponym-hypernym term pairs ($152_A$) are obtained. In an exemplary embodiment, pattern matching and sub-string matching are utilized to obtain hyponym-hypernym term pair, although in an embodiment, other strategies may be utilized. Similarly, in an embodiment, the NLP manager (152) utilizes pattern and sub-string matching to identify and extract term pairs ($152_A$).

It is understood in the art that such patterns based approaches creates output that suffers from recall, i.e. missing pairs, and may contain incorrect, i.e. noisy, term pairs due to ambiguity of language and richness in syntactic expression and structure in the input corpora. As shown herein, the graph manager (154) is operatively coupled to the NLP manager (152). The graph manager (154) constructs a cross-domain directed graph, $G_{input}$ ($154_A$), based on the extracted hyponym-hypernym term pairs, also referred to herein as noisy term pairs. The directed graph, $G_{input}$ has a set of vertices, V, that represent a set of terms ($v_i$, $v_j$) in the term pairs, and edges, E. The directed graph, $G_{input}=(V_{input}, E_{input})$, where $V_{input}$ denotes the set of terms ($v_i$, $v_j$), and ($v_i$, $v_j)\in E_{input}$ if and only if the set of term ($v_i$, $v_j$) belongs to the list of extracted noisy hyponym-hypernym term pairs. The input document collection spans multiple domains. Accordingly, $E_{input}$ has both inter-domain and intra-domain edges.

The ML manager (156) is shown herein with an operatively coupled ML model ($156_A$), e.g. $model_A$, which is subject to training to build a taxonomy structure for the corpus that is the subject of the term pair extraction. The ML manager (156) is also shown herein operatively coupled to the graph manager (154). The training of $model_A$ ($156_A$) is shown and described in detail FIGS. 3-5. The model training includes the $model_A$ ($156_A$) receiving the extracted term pairs ($152_A$) from the ML manager (156) via the NLP manager (152), subjecting a representation of a node in the cross-domain constructed graph, $graph_A$ ($154_A$) to an iterative update using a graph neural network (GNN) to aggregate representations of one or more neighbors of node into clusters. The GNN encodes cross-domain term pairs, effectively allowing gradient transfer between different domains. The model training further includes application of a semantic clustering aggregation to the clusters. The semantic cluster aggregation includes application of cluster based pooling and unpooling to generate node representations that possess latent cluster information. The cluster based pooling creates a cluster graph that comprises a set of cluster nodes with representations learned based on a trainable cluster assignment matrix. The cluster based unpooling decodes the created cluster graph into an original graph using the learned cluster assignment matrix. Details of the pooling and unpooling are shown and described in FIGS. 3 and 5. Accordingly, the $model_A$ ($156_A$) is subject to training to produce cluster relationships among term pairs from the extracted set of cross-domain term pairs that are determined to be related.

As further shown, the taxonomy manager (158), also referred to herein as a DAG generator, is operatively coupled to the ML manager (156). The taxonomy manager (158) produces a preliminary taxonomy ($158_A$) through application of the training ML model, e.g. $model_A$ ($156_A$), to the cross-domain graph ($154_A$). Application of the ML model accumulates and encodes cluster relationships, and predicts connection between the term pairs. Details of producing the preliminary taxonomy are shown and described in FIG. 6. The preliminary taxonomy is subject to enrichment to produce system generated taxonomy ($158_B$) with term pairs having valid hypernym relationship. In an embodiment, the system generated taxonomy ($158_B$) may be communicated from the server (110) to one or more of the computing devices (180), (182), (184), (186), (188), and (190) across the network (105).

The enrichment includes the taxonomy manager (158) subjecting the preliminary taxonomy ($158_A$) to a selective filter or selective filtering process to remove term pairs from the preliminary taxonomy with a predicted score that does not meet a threshold. Details of the filtering process are shown and described in FIG. 6. In addition to the selective filter application, the ML model ($156_A$) may apply one or more constraint based regularizers to the preliminary taxonomy ($158_A$) to promote one or more taxonomy configurations that satisfy the DAG and one or more connectivity constraints. Application of the constraint based regularizers include, but are not limited to, enforcement that all the terms within the taxonomy are connected to a root note, and enforcement of no internal looping. Accordingly, the selective filtering uses a threshold to filter out term pairs from the preliminary taxonomy ($158_A$), and to produce the system generated taxonomy ($158_B$).

The various computing devices (180), (182), (184), (186), (188), and (190) in communication with the network (105) demonstrate access points for to the AI platform (150) and the knowledge base (160). Some of the computing devices may include devices for use by the AI platform (150), and in an embodiment the tools (152), (154), (156), and (158) to support system construction of a taxonomy. The network (105) may include local network connections and remote connections in various embodiments, such that the AI platform (150) and the embedded tools (152), (154), (156), and (158) may operate in environments of any size, including local and global, e.g. the Internet. Accordingly, the server (110) and the AI platform (150) serve as a front-end system, with the knowledge base (160) and one or more of the ML models(s) serving as the back-end system.

As described in detail below, the server (110) and the AI platform (150) derive and construct a system generated taxonomy from a list of terms extracted from a corpus. Though shown as being embodied in or integrated with the server (110), the AI platform (150) may be implemented in a separate computing system (e.g., 190) that is connected across the network (105) to the server (110). Similarly, although shown local to the server (110), the tools (152), (154), (156), and (158) may be collectively or individually distributed across the network (105). Wherever embodied, the NLP manager (152), graph manager (154), ML manager (156), and taxonomy manager (158) are utilized to support both a training cycle to train the ML model to generate the preliminary taxonomy and an inference cycle to enable the ML model to refine the preliminary taxonomy through selective filtering and application of one or more constraint based regularizers.

Term pairs and a cross-domain directed graphs based on the term pairs may be communicated to the server (110) across the network (105). For example, in an embodiment, one or more cross-domain directed graphs may be communicated to the server (110) from nonvolatile data store ($190_A$). The ML manager (156) supports and enables the training cycle and the taxonomy manager (158) supports and enables the inference cycle whether the cross-domain directed graph is received from the knowledge base (160) or across the network (105).

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
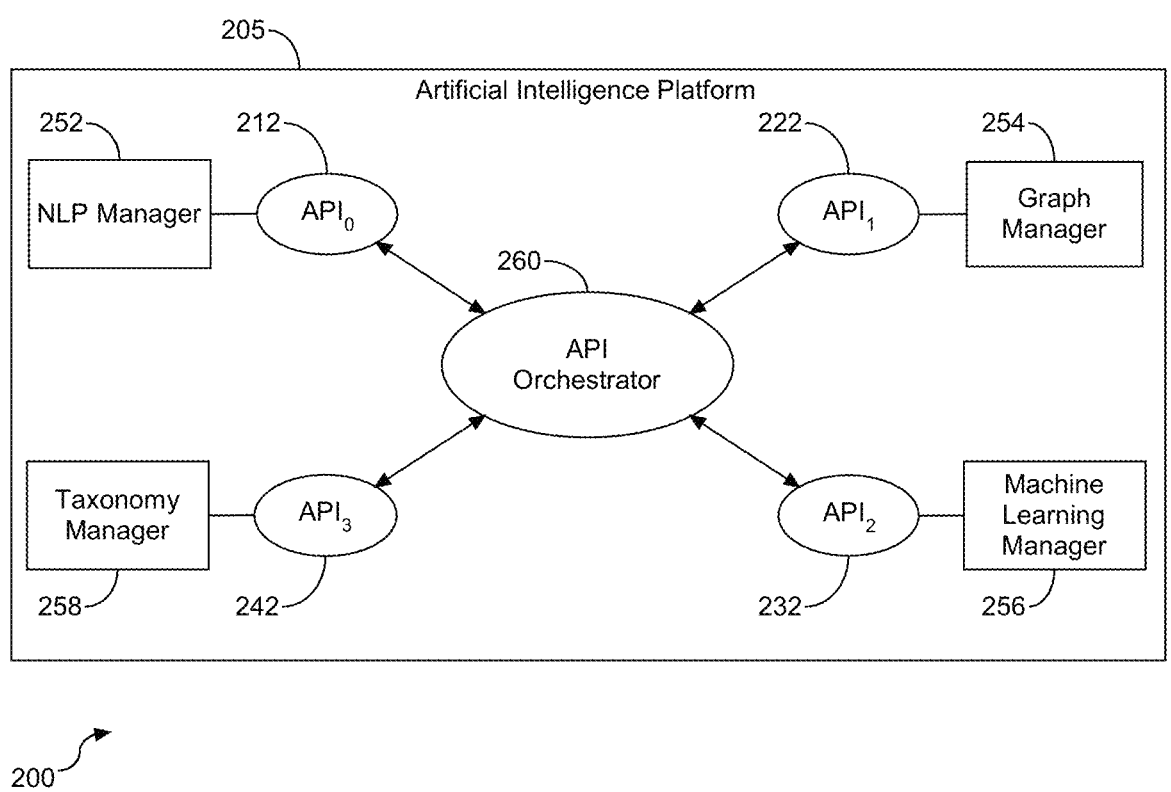
FIG. 2 depicts a block diagram illustrating the tools shown in FIG. 1 and their associated APIs.

An Application Program Interface (API) is understood in the art as a software intermediary between two or more applications. With respect to the risk evaluation and modification of an executable codified infrastructure shown and described in FIG. 1, one or more APIs may be utilized to support one or more of the AI platform tools, including the NLP manager (152), the graph manager (154), the ML manager (156), and the taxonomy manager (158), and their associated functionality. Referring to FIG. 2, a block diagram (200) is provided illustrating the AI platform tools and their associated APIs. As shown, a plurality of tools are embedded within the AI platform (205), with the tools including the NLP manager (252) associated with $API_0$ (212), the graph manager (254) associated with $API_1$ (222), the ML manager (256) associated with $API_2$ (232), and the taxonomy manager (258) associated with $API_3$ (242). Each of the APIs may be implemented in one or more languages and interface specifications.

$API_0$ (212) provides support for NLP, and more specifically for extraction of hyponym-hypernym term pairs from a corpus, with the extracted term pairs includes one or more cross-domain term pairs. $API_1$ (222) provides support to construct a cross-domain directed graph based on the extracted term pairs. The constructed graph includes vertices and edges, with the vertices representing terms, and the edges representing relationships between terms. The edges in the constructed graph include both intra-domain and inter-domain edges. $API_2$ (232) provides support for training a ML model that utilizes the graph constructed by $API_1$ (222) to encode cross-domain pairs, effectively allowing gradient transfer between different domains represented in the constructed graph. $API_3$ (242) provides support for production of a preliminary taxonomy and subjecting the preliminary taxonomy to selective filtering to produce a system predicted taxonomy. As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
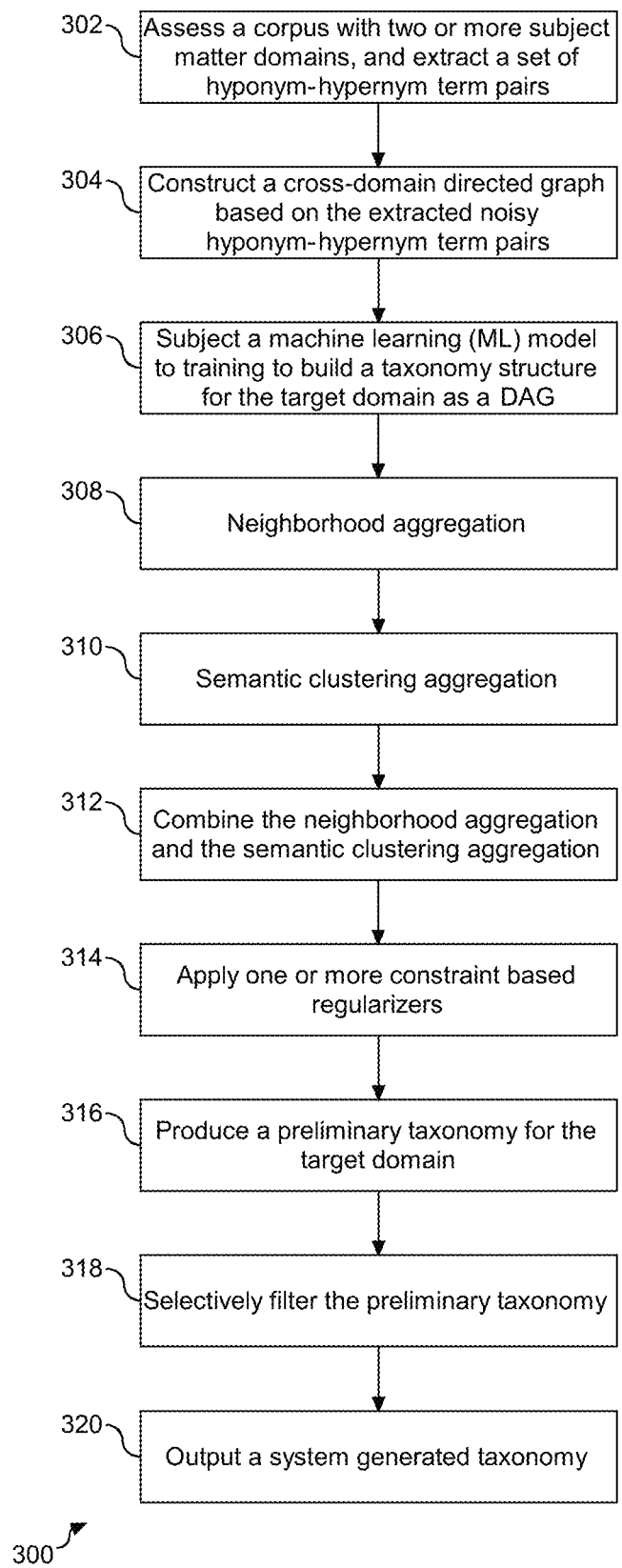
FIG. 3 depicts a flow chart to illustrate a GNN based cross-domain transfer framework for taxonomy construction.

Referring to FIG. 3, a flow chart (300) is provided to illustrate a GNN based cross-domain transfer framework for taxonomy construction. A corpus with two or more subject matter domains, e.g. input corpora, is assessed and a set of hyponym-hypernym term, e.g. word, pairs are extracted from the corpus (302). The set of extracted term pairs are referred to as a candidate set of hyponym-hypernym term pairs extracted from a collection of input corpora that spans multiple domains. The candidate hyponym-hypernym term pairs are obtained. In an exemplary embodiment, pattern matching and sub-string matching are utilized to obtain hyponym-hypernym term pairs, although in an embodiment, other strategies may be utilized. In an embodiment, the pattern and sub-string matching utilizes natural language processing to identify and extract term pairs. It is understood in the art that such patterns based approaches creates output that suffers from recall, i.e. missing pairs, and may contain incorrect, i.e. noisy, term pairs due to ambiguity of language and richness in syntactic expression and structure in the input corpora. A cross-domain directed graph, $G_{input}$ is constructed based on the extracted noisy hyponym-hypernym term pairs (304). The directed graph, $G_{input}$ has a set of vertices, V, and edges, E, such that $G_{input}=(V_{input}, E_{input})$. $V_{input}$ denotes a set of terms $(v_i, v_j)$, and $(v_i, v_j) \in E_{input}$ if and only if the set of term $(v_i, v_j)$ belongs to the list of extracted noisy hyponym-hypernym term pairs. The input document collection spans multiple domains. Therefore, $E_{input}$ has both inter-domain and intra-domain edges.

Given a list of terms for a target domain, a machine learning (ML) model is subject to training to build a taxonomy structure for the target domain as a DAG (306). The ML model training at step (306) includes receiving a list of terms from the target domains and leveraging a cross-domain graph encoder to support embedding generation, wherein embedding is a vector representation for terms. The list of terms received as part of the ML training at step (306) is also referred to as a test set, and is used to extract candidate term pairs for the taxonomy structure being built from the cross-domain noisy graph.

Figure 4:
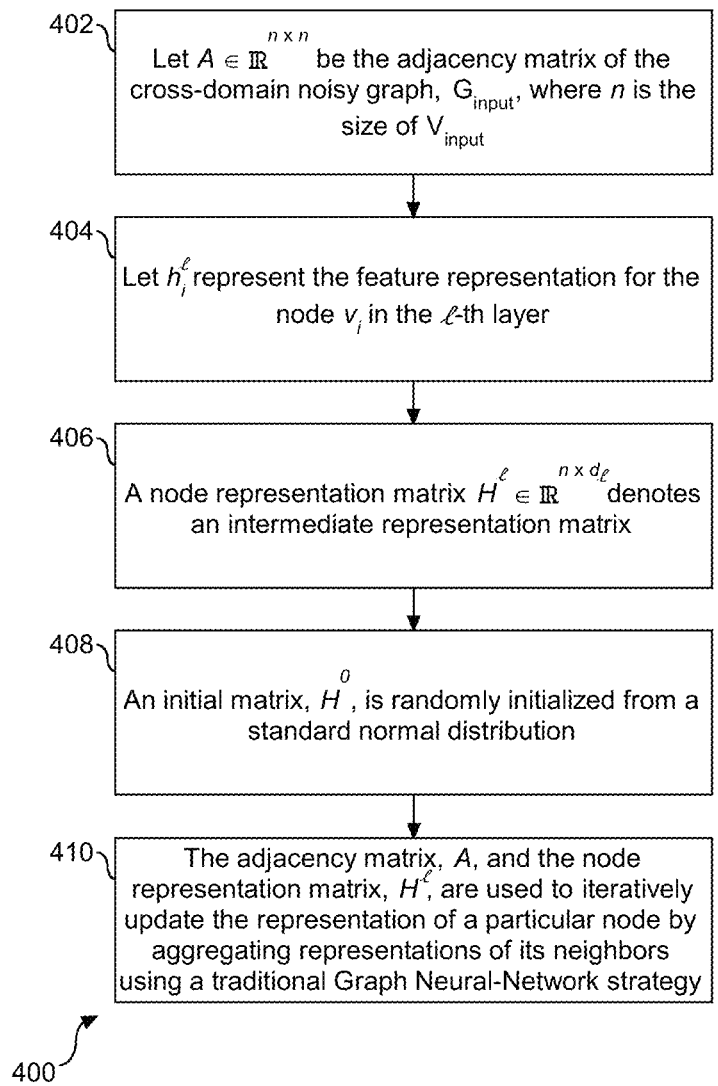
FIG. 4 depicts a flow chart to illustrate neighborhood aggregation.

Two processes are conducted as part of the ML at step (308) for embedding, and are shown herein as neighborhood aggregation (308) and semantic clustering aggregation (310). The neighborhood aggregation (308) iteratively updates a representation of a particular node in the cross domain directed graph by aggregating representations of neighbors of the nodes into clusters. Referring to FIG. 4, a flow chart (400) is provided to illustrate the neighborhood aggregation. For the neighborhood aggregation, let $A \in \mathbb{R}^{n \times n}$ be the adjacency matrix of the cross-domain noisy graph, $G_{input}$, where n is the size of $V_{input}$ (402). Let $h_i^l$ represent the feature representation for the node $v_i$ in the l-th layer (404), and therefore a node representation matrix $H^l \in \mathbb{R}^{n \times d_l}$ denotes an intermediate representation matrix for all the nodes in $G_{input}$ (406). An initial matrix, $H^0$, is randomly initialized from a standard normal distribution (408). The adjacency matrix, A, and the node representation matrix, $H^l$, are used to iteratively update the representation of a particular node by aggregating representations of its neighbors using a traditional GNN strategy (410). A graph neural network (GNN) is used for the iterative update, wherein a layer in the GNN employs a general message passing architecture which includes a message propagation function, M, and a vertex update function, U. The message propagation function is used to get messages from neighbors. The message passing works via the following equations:

$$m_v^{l+1} = M(h_u^l) \forall u \in N(v)$$

$$h_v^{l+1} = U(h_v^l, m_v^{l+1})$$

where N(v) denotes the neighbors of node v and m is the message. In addition, the message propagation function, M, and the vertex update function, U, are defined as follows:

$$M(h_u^l) = \Sigma_{u \in N(v)} A_{vu} h_u^l, \forall u \in N(v)$$

$$U(h_v^l, m_v^{l+1}) = \sigma(m_v^{l+1} \theta^l + h_v^l \theta^l)$$

where $\theta^l \in \mathbb{R}^{d_l \times d_{l+1}}$ denotes trainable parameters for layer l and σ represents an activation function.

Figure 5:
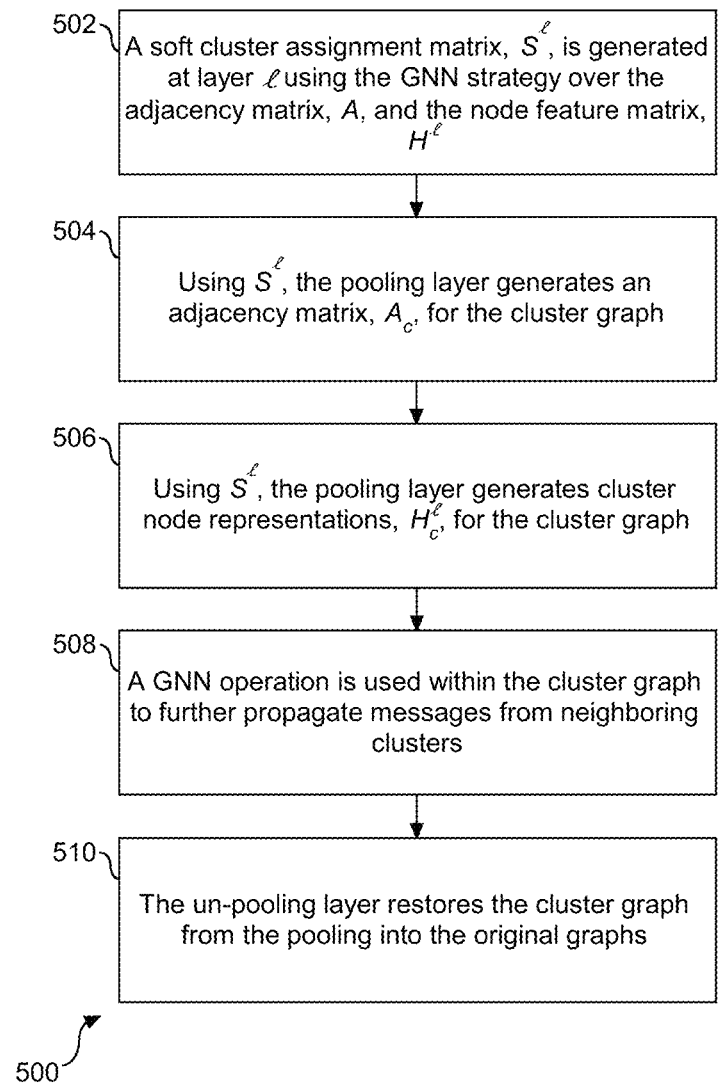
FIG. 5 depicts a flow chart to illustrate semantic clustering aggregation.

The semantic clustering aggregation at step (310) is the second of two strategies used for embedding generation. Semantic clustering aggregation at step (310), which operates on output from the neighborhood aggregation at step (308), utilizes soft clustering based pooling and unpooling that uses semantic clustering aggregation for learning model representations. Referring to FIG. 5, a flow chart (500) is provided to illustrate the semantic clustering aggregation. Learned representations from neighborhood aggregation form cluster graphs, but are likely not to be uniformly distributed in Euclidean Space. The semantic clustering aggregation shares similarity information for any pair of terms in the vocabulary. The un-pooling decodes the cluster graphs, created by the pooling, into the original graph using the same cluster assignment matrix learned in the pooling. In an embodiment, the learned semantic cluster nodes function as bridges from the same or different clusters to pass messages.

Analogous to an auto-encoder, the pooling adaptively creates a cluster graph comprising a set of cluster nodes whose representations are learned based on a trainable cluster assignment matrix. Mathematically, a soft cluster assignment matrix, $S^l \in \mathbb{R}^{n \times n_c}$, is generated at layer l using the GNN strategy over the adjacency matrix, A, and the node feature matrix, $H^l$ (502), wherein $n_c$ is the number of clusters. Each row in $S^l$ corresponds to one of n nodes in layer l, and each column correspond to one of the $n_c$ clusters. A pooling layer uses the adjacency matrix, A, and the node feature matrix, $H^l$, to generate the soft cluster assignment matrix, $S^l$, as:

$$S^l = \text{softmax}(GNN_{l,cluster}(A, H^l))$$

where the softmax is a row-wise softmax function, and $\theta_{cluster}^l \in \mathbb{R}^{d_l \times n_c}$ denotes all trainable parameters in $GNN_{l,cluster}$. Since the soft cluster assignment matrix, $S^l$, is calculated based on node embeddings, nodes with similar features and local structure will have a similar cluster assignment.

Using the soft cluster assignment matrix, $S^l$, the pooling layer generates an adjacency matrix, $A_c$, for the cluster graph (504) and generates cluster node representations, $H_c^l$, for the cluster graph (506), as follows:

$$H_c^l = (S^l)^T H^l \in \mathbb{R}^{n_c \times d_l}$$

$$A_c = (S^l)^T A S^l \in \mathbb{R}^{n_c \times n_c}$$

A GNN operation, shown herein as:

$$H_c^{l+1} = GNN_l(A_c, H_c^l) \in \mathbb{R}^{n_c \times d_{l+1}}$$

The GNN operation is used within the cluster graph to further propagate messages from neighboring clusters (508). The trainable parameters in $GNN_l$ are $\theta^l \in \mathbb{R}^{d_l \times d_{l+1}}$.

The unpooling layer restores, e.g. decodes, the cluster graph created from the pooling into the original graphs using the learned cluster assignment matrix for passing clustering information to the original graph (510). The restoration is conducted as follows:

$$\tilde{H}^{l+1} = S^l H_c^{l+1} \in \mathbb{R}^{n \times d_{l+1}}$$

Output from the pooling and unpooling layers result in the node representations possessing latent cluster information. Returning to FIG. 3, the neighborhood aggregation from step (308) and the semantic clustering aggregation from step (310) are combined (312) via a residual connection as:

$$H^{l+1} = \text{concate}(\tilde{H}^{l+1}, H^l)$$

where concate concatenates the two matrices. The $\tilde{H}^{l+1}$ matrix is the output of the pooling-unpooling step. As part of the ML training, one or more constraint based regularizers are applied to the preliminary taxonomy to promote one or more taxonomy configurations and connectivity constraints that satisfy the DAG (314). Examples of the constraint regularizers include enforcing that all the terms within the taxonomy are connected either directly or indirectly to a root node, and no internal looping, which is enforced via soft constraint by ensuring that the resulting adjacency matrix A violates the condition tr $(e^{A \circ A}) - n = 0$ as little as possible.

After application of the regularizer(s) at step (314), the training process is complete and the taxonomy manager (158) produces a preliminary taxonomy (158$_A$) for the target domain (316). At step (316), the taxonomy manager (158) takes the vector based representation of terms within $V_{input}$ to predict is-a relationships between term pairs by using one or more training signals from the list of node-pairs, from $G_{input}$, which are related via an is-a relationship. While predicting the is-a relationships between term pairs, the ML model (156$_A$) ensures that the formed resulting graph does not contain cycles nor is disconnected, which in an exemplary embodiment is ensured by adding constraint based regularizers. Accordingly, the taxonomy manager (158) takes in the list of terms from the target domain and feeds the list of terms into the ML model (156$_A$), and selects only those pairs whose model based probability exceeds a threshold.

Figure 6:
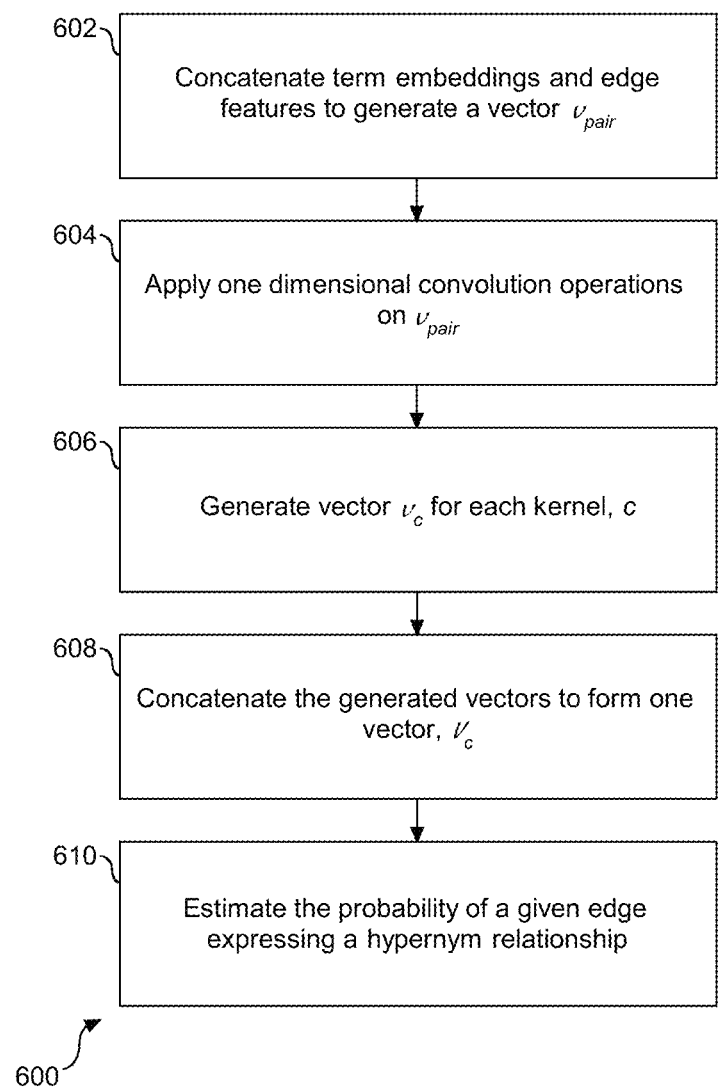
FIG. 6 depicts a flow chart to illustrate a process for estimating the edge probability with respect to representation of a valid hypernym relationship.

For each edge within the noisy graph, G, the taxonomy manager (158) estimates a predicted connection between terms in the form of a probability that the edge represents a valid hypernym relationship. This is referred to herein as edge prediction between terms. In an embodiment, a convolutional operation is utilized to estimate the probability. Referring to FIG. 6, a flow chart (600) is provided to illustrating a process for estimating the edge probability with respect to representation of a valid hypernym relationship. Term embeddings and edge features, also known as relation features, are concatenated (602). The variable, v, represents a term, and $v_{hypo}$ and $v_{hyper}$ are the term embeddings for a candidate hyponym-hypernym pair. The concatenation is mathematically represented as:

$$v_{pair} = \text{concate}(v_{hypo}, v_{hyper}, v_{feas})$$

where $v_{feas}$ denotes a feature vector for the edge (hypo, hyper), which includes edge frequency and substring features. Examples of substring features include: ends with, contains, prefix match, suffix match, length of longest common substring (LCS), length difference, and a Boolean feature denoting whether LCS is in the set of terms, $v_{input}$. A one dimensional convolution operation is applied on $v_{pair}$ (604). The convolutional operation increases expressiveness of the DAG generator (158) through additional interaction between participating embeddings. For the convolution operation at step (604), C different kernels, also referred to filters, are parameterized by $\{w_c, 1 \leq c \leq C\}$. The convolution operation is calculated as follows:

$$v_c = [U_c(v_{pair}, 0), \ldots, U_c(v_{pair}, d_v - 1)]$$

$$U_c(v_{pair}, p) = \Sigma_{\tau=0}^{K-1} w_c(\tau) \hat{v}_{pair}(p+\tau)$$

where K denotes the kernel width, $d_v$ denotes the size of $v_{pair}$, p denotes the position to start the convolution operation, and the kernel parameters $w_c$ are trainable. The variable, $\hat{v}_{pair}$, denotes a padded version of $v_{pair}$, with an applied padding strategy. In an embodiment, the padding strategy is as follows: if $|K|$ is odd then $v_{pair}$ is padded with $[K/2]$ zeros on both sides, and if $|K|$ is even then $[K/2]-1$ zeros are padded at the beginning of $v_{pair}$ and $[K/2]$ zeros are padded at the end of $v_{pair}$.

Each kernel, c, generates the vector $v_c$ (606). Since a plurality of vectors $v_c$ are generated, the generated vectors subject to concatenation (608) to form one vector, $V_c$, i.e. $V_c$=concatenate $(v_0, v_1, \ldots, v_c)$. The probability of a given edge expressing a hypernym relationship is estimated (610) as follows:

$$p_{(hypo, hyper)} = \text{sigmoid}(V_c^T W)$$

where (hypo, hyper) is an edge and W is a parameter matrix of a fully connected layer. The resulting adjacency matrix, $A \in \mathbb{R}^{n \times n}$ of the cross-domain noisy graph is a DAG if and only if tr $(e^{A \circ A}) - n = 0$, where tr represents the trace of a matrix, $\circ$ represents a Hadamard product, and e is a matrix exponential. The edge probability estimation shown herein effectively obtains a score for the edges of the preliminary taxonomy shown, which is then utilized to selectively filter the preliminary taxonomy in the enrichment process (318). Following the selective filtering at step (318), a system predicted taxonomy for the target domain is formed as output with the remaining terms (320). Accordingly, the selective filtering uses a threshold to filter out term pairs with predicted scores that do not meet the threshold.

As shown and described in FIGS. 1-6, a system, method, and computer program product are provided to enable and support a GNN based cross-domain transfer framework to construct taxonomies. Latent features of taxonomy construction are learned by a ML model from existing domains to guide the learning of an unseen domain. The learned or trained ML model is then used to generate a taxonomy for a new and previously unknown domain given a set of terms for that domain.

Embodiments shown and described herein may be in the form of a computer system for use with an AI platform for providing machine learning directed generation of a system predicted taxonomy. Aspects of the tools (152), (154), (156), and (158) and their associated functionality may be embodied in a computer system/server in a single location, or in an embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the system and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

Figure 7:
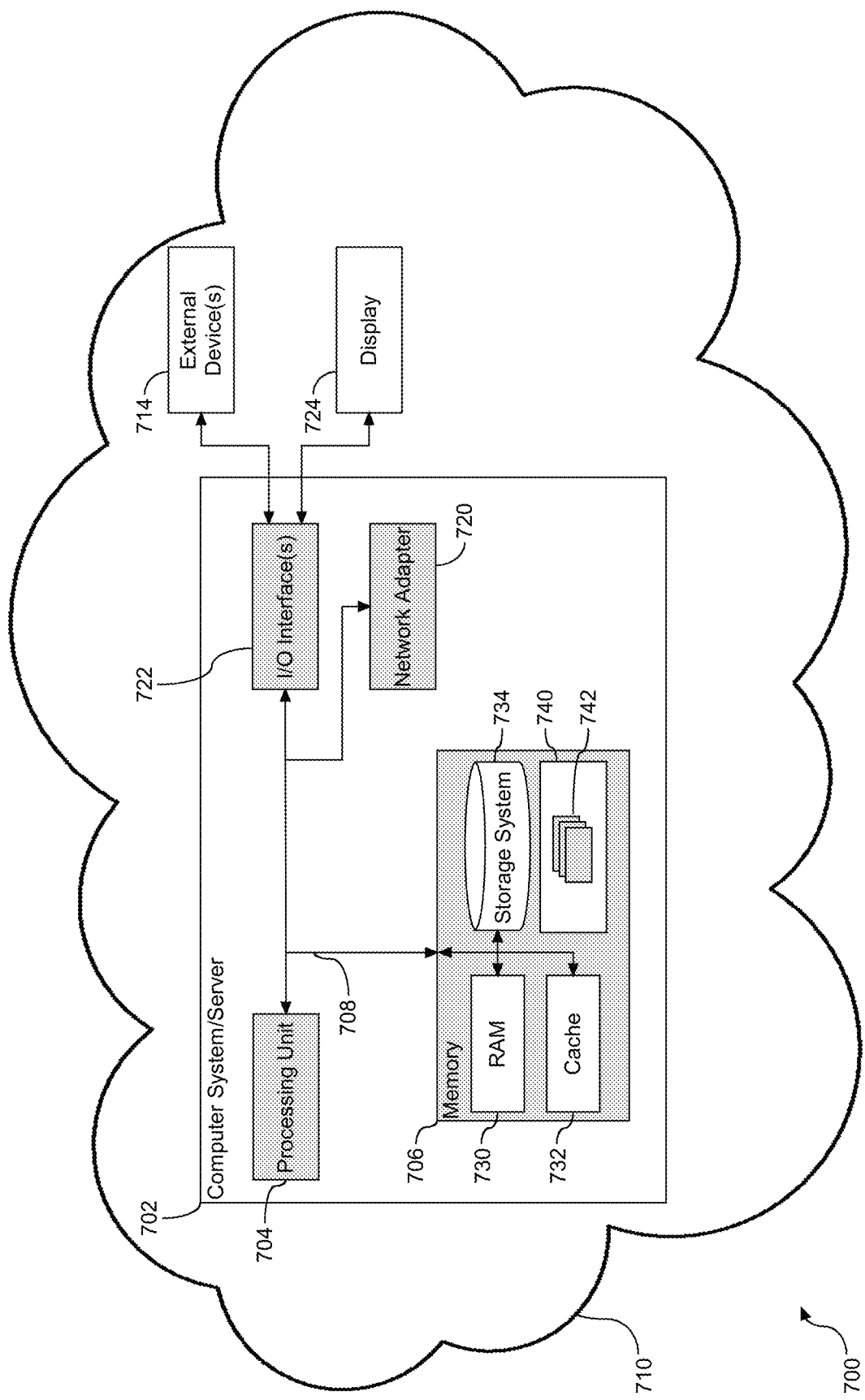
FIG. 7 is a block diagram depicting an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments of the adversarial training and dynamic classification model evolution. For example, the set of program modules (742) may include the modules configured as the tools (152), (154), (156), and (158) described in FIG. 1.

Host (702) may also communicate with one or more external devices (714), such as a keyboard, a pointing device, a sensory input device, a sensory output device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In an embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

In an embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
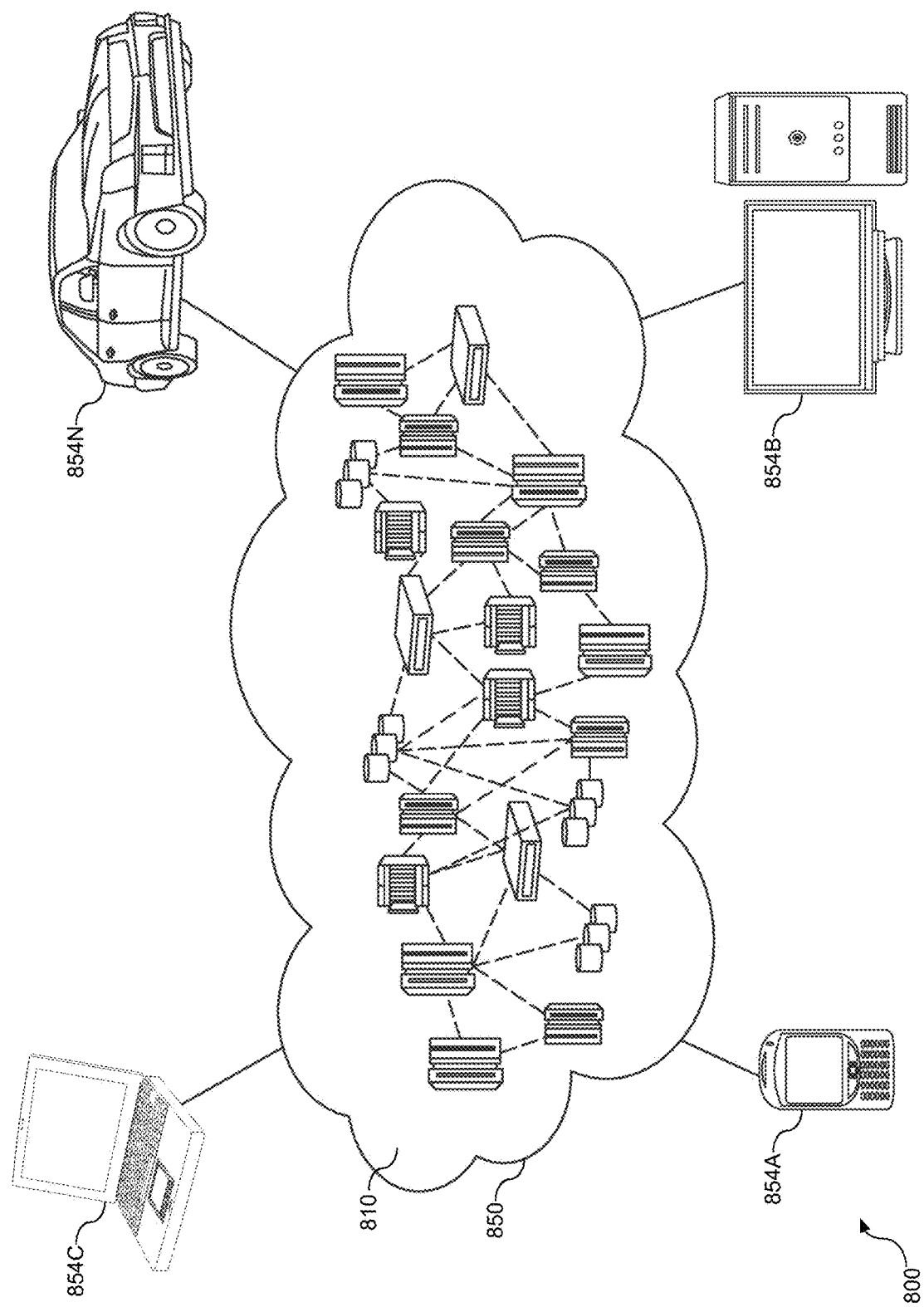
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
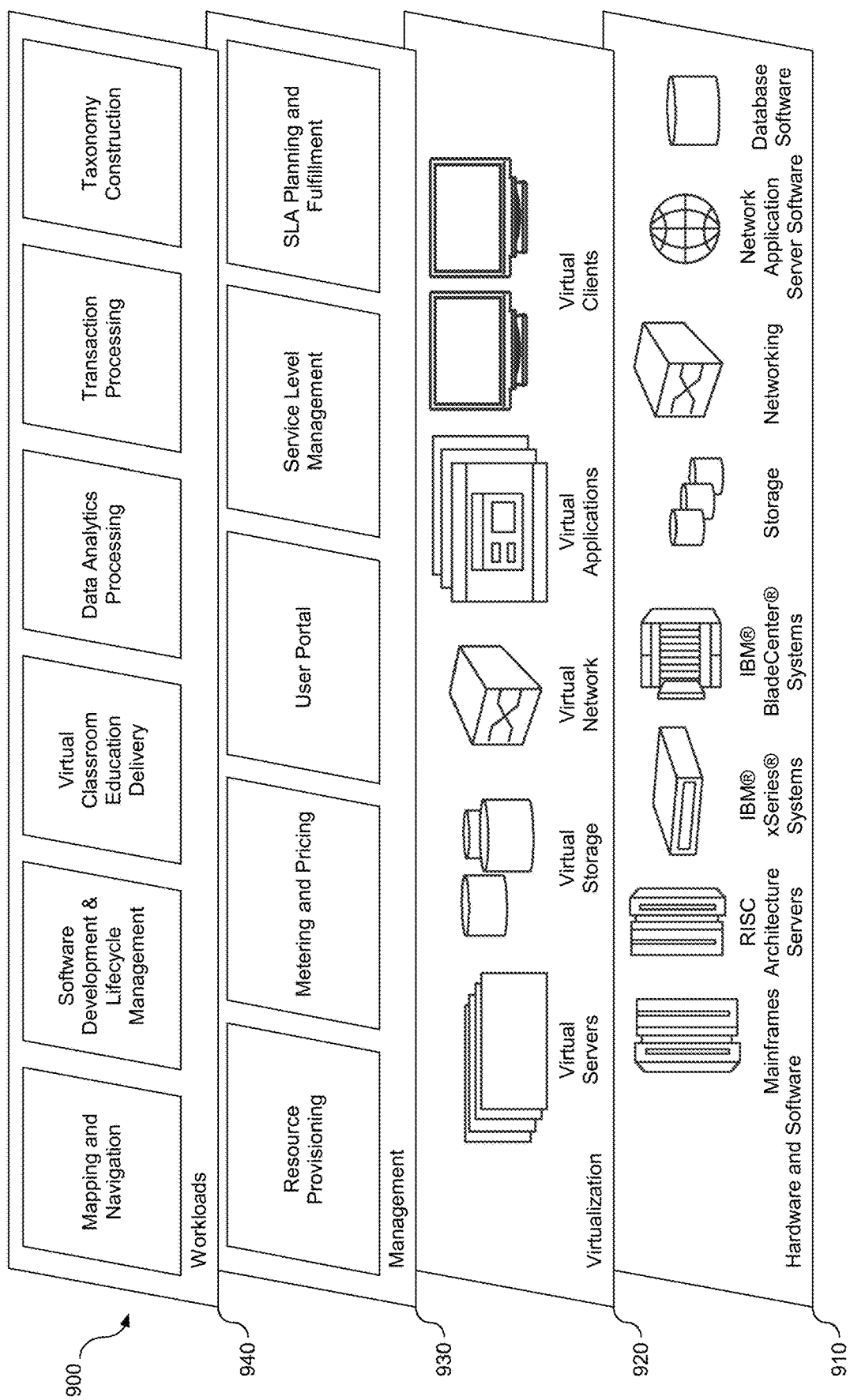
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and taxonomy construction via graph-based cross-domain knowledge transfer.

The system and flow charts shown herein may also be in the form of a computer program device for automatic taxonomy construction. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the codified infrastructure, including the automatic taxonomy construction may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
   a processing unit operatively coupled to memory;
   an artificial intelligence (AI) platform operatively coupled to the processing unit, the AI platform configured with one or more tools to construct a taxonomy, the tools comprising:
   a natural language processing (NLP) engine to extract a set of hyponym- hypernym term pairs from a corpus, the corpus including two or more subject matter domains, and the extracted set of hyponym-hypernym term pairs including one or more cross-domains hyponym-hypernym term pairs;
   a graph manager to construct a cross-domain directed graph based on the extracted set of hyponym-hypernym term pairs, the directed graph including vertices representing terms in the pairs and edges, wherein the edges include intra-domain edges and inter-domain edges;
   a machine learning (ML) manager to train a ML model to build a taxonomy structure for a target domain as a directed acyclic graph (DAG, the training comprising:
   receipt of a list of terms from the target domain;
   iteratively updating a representation of a node in the cross-domain directed graph using a graph neural network (GNN) to aggregate representations of one or more neighbors of the node into clusters;
   application of semantic clustering aggregation to the clusters, the aggregation including cluster based pooling and unpooling to generate node representations possessing latent cluster information; and
   a taxonomy manager to produce the preliminary taxonomy, the taxonomy manager to accumulate and encode cluster relationships, and predict connections between terms; and
   the taxonomy manager to enrich the preliminary taxonomy, including selectively filter hyponym-hypernym term pairs from the preliminary taxonomy and generate a system predicted taxonomy for the target domain from the selective filtering as output.

2. The computer system of claim 1, wherein the cluster based pooling creates a cluster graph comprising a set of cluster nodes having representations learned based on a trainable cluster assignment matrix.

3. The computer system of claim 2, wherein the cluster based unpooling decodes the created cluster graph into an original graph using the learned cluster assignment matrix.

4. The computer system of claim 1, wherein producing the preliminary taxonomy includes the taxonomy manager to apply one or more constraint based regularizers to promote taxonomy configurations that satisfy the DAG.

5. The computer system of claim 4, wherein application of the one or more constraint based regularizers to promote taxonomy configurations further comprises the taxonomy manager to:
   enforce that all the terms within the taxonomy are connected to a root node; and
   enforce no internal looping.

6. The computer system of claim 1, wherein the NLP manager extracts the set of hyponym-hypernym term pairs automatically using pattern matching or substring matching.

7. A computer program product to leverage an artificial intelligence (AJ) platform to construct a taxonomy, the computer program product comprising a computer readable storage medium having program code embodied therewith, the program code executable by a processor to:
   apply natural language processing (NLP) to extract a set of hyponym- hypernym term pairs from a corpus, the corpus including two or more subject matter domains, and the extracted set of hyponym-hypernym term pairs including one or more cross-domains hyponym-hypernym term pairs;
   construct a cross-domain directed graph based on the extracted set of hyponym- hypernym term pairs, the directed graph including vertices representing terms in the pairs and edges, wherein the edges include intra-domain edges and inter-domain edges;
   train a machine learning (ML) model to build a taxonomy structure for a target domain as a directed acyclic graph (DAG, the training comprising:
   receipt of a list of terms from the target domain;
   iteratively updating a representation of a node in the cross-domain directed graph using a graph neural network (GNN) to aggregate representations of one or more neighbors of the node into clusters;

application of semantic clustering aggregation to the clusters, the aggregation including cluster based pooling and unpooling to generate node representations possessing latent cluster information; and produce the preliminary taxonomy, including accumulate and encode cluster relationships and predict connections between terms; and enrich the preliminary taxonomy, including selectively filter hyponym- hypernym term pairs from the preliminary taxonomy and generate a system predicted taxonomy for the target domain from the selective filtering as output.

8. The computer program product of claim 7, wherein the cluster based pooling includes program code to create a cluster graph comprising a set of cluster nodes having representations learned based on a trainable cluster assignment matrix.

9. The computer program product of claim 8, wherein the cluster based unpooling includes program code to decode the created cluster graph into an original graph using the learned cluster assignment matrix.

10. The computer program product of claim 7, wherein the program code to produce the preliminary taxonomy includes application of one or more constraint based regularizers to promote taxonomy configurations that satisfy the DAG and connectivity constraints.

11. The computer program product of claim 10, wherein application of the one or more constraint based regularizers to promote taxonomy configurations further comprises program code to:

enforce that all the terms within the taxonomy are connected to a root node; and enforce no internal looping.

12. The computer program product of claim 7, wherein the application of NLP includes program code to extract the set of hyponym-hypernym term pairs automatically using pattern matching or substring matching.

13. A method for utilizing artificial intelligence for constructing a taxonomy, comprising:

extracting a set of hyponym-hypernym term pairs from a corpus, the corpus including two or more subject matter domains, and the extracted set of hyponym-hypernym term pairs including one or more cross-domains hyponym-hypernym term pairs;

constructing a cross-domain directed graph based on the extracted set of hyponym- hypernym term pairs, the directed graph including vertices representing terms in the pairs and edges, wherein the edges include intra-domain edges and inter-domain edges;

training a learning model to build a taxonomy structure for the corpus as a directed acyclic graph (DAG, the training comprising:

receiving the extracted term pairs from the corpus;

iteratively updating a representation of a node in the cross-domain directed graph using a graph neural network (GNN) by aggregating representations of one or more neighbors of the nodes into clusters;

applying semantic clustering aggregation to the clusters, the aggregation including cluster based pooling and unpooling to generate node representations possessing latent cluster information; and encoding accumulated cluster relationships, including producing a preliminary taxonomy for a target domain and predicting connections between terms; and enriching the preliminary taxonomy, including selectively filtering hyponym hypernym term pairs from the preliminary taxonomy, and generating a system predicted taxonomy for the target domain from the selective filtering as output.

14. The method of claim 13, wherein the cluster based pooling creates a cluster graph comprising a set of cluster nodes having representations learned based on a trainable cluster assignment matrix.

15. The method of claim 14, wherein the cluster based unpooling decodes the created cluster graph into an original graph using the learned cluster assignment matrix.

16. The method of claim 13, wherein producing the preliminary taxonomy includes applying one or more constraint based regularizers to promote taxonomy configurations that satisfy the DAG and connectivity constraints.

17. The method of claim 16, wherein applying the one or more constraint based regularizers to promote taxonomy configurations further comprises:

enforcing that all the terms within the taxonomy are connected to a root node; and enforcing no internal looping.

18. The method of claim 13, wherein the set of hyponym-hypernym term pairs are automatically extracted using pattern matching or substring matching.

* * * * *